(12) United States Patent
Yasukawa et al.

(10) Patent No.: US 11,705,994 B2
(45) Date of Patent: Jul. 18, 2023

(54) COMMUNICATION APPARATUS AND DATA RECEPTION METHOD

(71) Applicant: NTT DOCOMO, INC., Tokyo (JP)

(72) Inventors: Shinpei Yasukawa, Tokyo (JP); Yousuke Sano, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 160 days.

(21) Appl. No.: 16/348,649

(22) PCT Filed: Nov. 13, 2017

(86) PCT No.: PCT/JP2017/040717
§ 371 (c)(1),
(2) Date: May 9, 2019

(87) PCT Pub. No.: WO2018/088549
PCT Pub. Date: May 17, 2018

(65) Prior Publication Data
US 2019/0268107 A1 Aug. 29, 2019

(30) Foreign Application Priority Data
Nov. 14, 2016 (JP) .............................. 2016-221964

(51) Int. Cl.
*H04L 1/1829* (2023.01)
*H04L 1/1812* (2023.01)
(Continued)

(52) U.S. Cl.
CPC .............. *H04L 1/1861* (2013.01); *H04L 1/18* (2013.01); *H04L 1/1812* (2013.01); *H04W 28/04* (2013.01)

(58) Field of Classification Search
CPC ....... H04L 1/1861; H04L 1/1812; H04L 1/08; H04L 1/1819; H04L 1/1896; H04L 1/1887
See application file for complete search history.

(56) References Cited

U.S. PATENT DOCUMENTS 7,523,383 B2 * 4/2009 Yun .................. H03M 13/6375
714/790
2010/0192035 A1 7/2010 Sagfors et al.
(Continued)

FOREIGN PATENT DOCUMENTS

JP 2010-530709 A 9/2010
WO 2008/156414 A2 12/2008

OTHER PUBLICATIONS

International Search Report issued in PCT/JP2017/040717 dated Jan. 30, 2018 (5 pages).
(Continued)

*Primary Examiner* — Jae Y Lee
*Assistant Examiner* — Aixa A Guadalupe Cruz
(74) *Attorney, Agent, or Firm* — Osha Bergman Watanabe & Burton LLP

(57) ABSTRACT

A communication apparatus in a radio communication system, including: a reception unit configured to receive control information including puncture information which indicates that there is a puncture resource in resources allocated to the communication apparatus from another communication apparatus; and a decoding unit configured to decode data received from the other communication apparatus in the allocated resources, wherein the decoding unit performs the decoding using the puncture information included in the control information received by the reception unit.

4 Claims, 17 Drawing Sheets

(51) Int. Cl.
*H04W 28/04* (2009.01)
*H04L 1/18* (2023.01)

(56) References Cited

U.S. PATENT DOCUMENTS

| | | | |
|---|---|---|---|
| 2014/0086197 | A1 | 3/2014 | Yang et al. |
| 2019/0098608 | A1* | 3/2019 | Yi .......................... H04L 27/26 |
| 2019/0116007 | A1* | 4/2019 | Yi ...................... H04L 27/2607 |
| 2019/0165906 | A1* | 5/2019 | Bala .................... H04L 27/3488 |
| 2020/0008216 | A1* | 1/2020 | Iyer ...................... H04W 72/23 |
| 2020/0229152 | A1* | 7/2020 | Park ...................... H04L 5/001 |

OTHER PUBLICATIONS

Written Opinion of the International Searching Authority issued in PCT/JP2017/040717 dated Jan. 30, 2018 (4 pages).
Samsung; "Multiplexing URLLC and eMBB in DL"; 3GPP TSG RAN WG1 Meeting #86bis, R1-1609059; Lisbon, Portugal; Oct. 10-14, 2016 (5 pages).
Intel Corporation; "Downlink URLLC transmission and multiplexing with eMBB"; 3GPP TSG RAN WG1 Meeting #87, R1-1612003; Reno, USA; Nov. 14-18, 2016 (11 pages).
CATT; "TTI bundling in TDD"; 3GPP TSG RAN WG2 #62, R2-082308; Kansas City, USA; May 5-9, 2008 (7 pages).
3GPP TS 36.321 V13.2.0; "3rd Generation Partnership Project; Technical Specification Group Radio Access Network; Evolved Universal Terrestrial Radio Access (E-UTRA); Medium Access Control (MAC) protocol specification (Release 13)"; Jun. 2016 (91 pages).
Office Action issued in the counterpart Chinese Patent Application No. 201780069712.0, dated Jun. 1, 2021 (15 pages).
Office Action issued in the counterpart Chinese Patent Application No. 201780069712.0, dated Feb. 10, 2022 (10 pages).

* cited by examiner

DL control

FIG.15A

| HARQ process ID | Puncture indicator |
|---|---|

FIG.15B

| HARQ process ID | Puncture indicator | A/N resource indicator |
|---|---|---|

COMMUNICATION APPARATUS AND DATA RECEPTION METHOD

TECHNICAL FIELD

The present invention relates to a communication apparatus such as a user equipment in a radio communication system.

BACKGROUND ART

At present, in 3rd Generation Partnership Project (3GPP), a next-generation system called 5G corresponding to a successor to Long Term Evolution (LTE)-Advanced which is one of the 4th generation radio communication system has been examined. In 5G, three use cases of extended mobile broadband (eMBB), massive machine type communication (mMTC), ultra reliability and low latency communication (URLLC) are mainly assumed.

An object of URLLC is to realize radio communication for low delay and high reliability. As a concrete plan for realizing low delay in URLLC, an introduction of a short transmission time interval (TTI) length (also referred to as a subframe length, a subframe interval, or a transmission time interval) or shortening of control delay from packet generation to data transmission has been examined. Further, as a concrete plan for realizing high reliability in URLLC, an introduction of a coding scheme and a modulation scheme of a low code rate for realizing low bit error rate or the like and diverse applications have been examined.

In URLLC, for example, realization of U-plane delay of, for example, 1 ms and a packet error rate of, for example, 10^-5 have been examined. To realize low delay, a method of further shortening a normal packet with a TTI length (for example, a packet of eMBB traffic) has been examined. In 5G, eMBB traffic and URLLC traffic are considered to coexist in the same carrier. In this case, since the TTI length of URLLC is shorter than that of eMMB, data for URLLC can be transmitted more frequently than that for eMBB.

CITATION LIST

Non-Patent Document

Non-Patent Document 1: 3GPP TS 36.321 V13.2.0 (2016-06)

SUMMARY OF THE INVENTION

Problem to be Solved by the Invention

As described above, since an object of URLLC is low delay and high reliability, it is considered that it is necessary to immediately transmit data even in abruptly occurring traffic. Therefore, when eMBB traffic and URLLC traffic coexist in the same carrier, as illustrated in FIG. 1, it is assumed that resources allocated to the MBB traffic are punctured and the URLLC traffic is allocated to the resource in some cases.

However, as described above, when the resources of the eMBB traffic are punctured, there is a possibility of a block error rate (BLER) in the eMBB traffic deteriorating due to an influence of the puncturing in the eMBB traffic. That is, since a log-likelihood ratio (LLR) of data received from resources including the punctured resources may not appropriately be calculated, a user equipment may not appropriately acquire the data.

The foregoing problem is a problem that occurs not only in eMBB traffic and URLLC traffic but also in general situations in which some of the resources can be punctured.

The invention is devised in view of the foregoing circumstances and an object of the invention is to provide a technology for enabling a communication apparatus to appropriate acquire data transmitted from another communication apparatus even when some of the resource allocated for data reception are punctured in the communication apparatus.

Means for Solving Problem

According to a technology of the present disclosure, there is provided a communication apparatus in a radio communication system. The communication apparatus includes: a reception unit configured to receive control information including puncture information which indicates a puncture resource in resources allocated to the communication apparatus from another communication apparatus; and a decoding unit configured to decode data received from the other communication apparatus in the allocated resources. The decoding unit performs the decoding using the puncture information included in the control information received by the reception unit.

Effect of the Invention

According to the technology of the present disclosure, there is provided a technology for enabling a communication apparatus to appropriate acquire data transmitted from another communication apparatus even when some of the resource allocated for data reception are punctured in the communication apparatus.

BRIEF DESCRIPTION OF DRAWINGS

FIG. 15A is a diagram illustrating an example of the configuration of downlink control information (downlink allocation information) in Example 5;

FIG. 15B is a diagram illustrating an example of the configuration of downlink control information (downlink allocation information) in Example 5;

MODE(S) FOR CARRYING OUT THE INVENTION

Hereinafter, an embodiment (the present embodiment) of the invention will be described with reference to the drawings. Embodiments to be described below are merely examples and embodiments to which the invention is applied are not limited to the following embodiments.

A radio communication system according to the present embodiment is assumed to support a communication scheme of at least LTE. Accordingly, when the radio communication system operates, a known technology defined in LTE can appropriately be used. However, the known technology is not limited to LTE. "LTE" used in the present specification is assume to have broad meanings including schemes of LTE-Advanced and schemes (for example, 5G) after LTE-Advanced unless otherwise mentioned. The invention can also be applied to communication schemes other than LTE.

In embodiments to be described below, communication of eMBB and communication of URLLC are adopted as a plurality of types of communication with different TTI lengths, but these are merely examples. The invention can also be applied to other communication other than the communication eMBB and the communication of URLLC. The number of types of communication which coexist is not limited to 2. The number of types of communication which coexist may be 3 or more.

In the embodiments to be described below, HARQ, NDI, TTI, subframes, TB, and other terms used in LTE of the related art are used. However, these terms are used to facilitate description, the same signals, functions, and the like may be referred to as other names.

In the embodiments to be described below, examples in which the technology related to the invention is applied to DL communication from the base station 20 to the user equipment 10 will be described. However, the technology related to the invention can also be applied not only to DL communication but also to UL communication and sidelink (SL) communication.

For example, in regard to the UL communication, application of the technology related to the invention can be realized by allowing a base station to have functions of a user equipment to be described below and allowing the user equipment to have functions of the base station to be described below. In regard to the sidelink (SL), application of the technology related to the invention can be realized by allowing one of user equipments to have a function of transmitting the same control information as downlink control information transmitted to be a base station to be described below and allowing the other user equipment to have the same function as a user equipment to be described below. Apparatuses to which the technology related to the invention is applied can be collectively referred to as communication apparatuses.

(Overall System Configuration)

Figure 2:
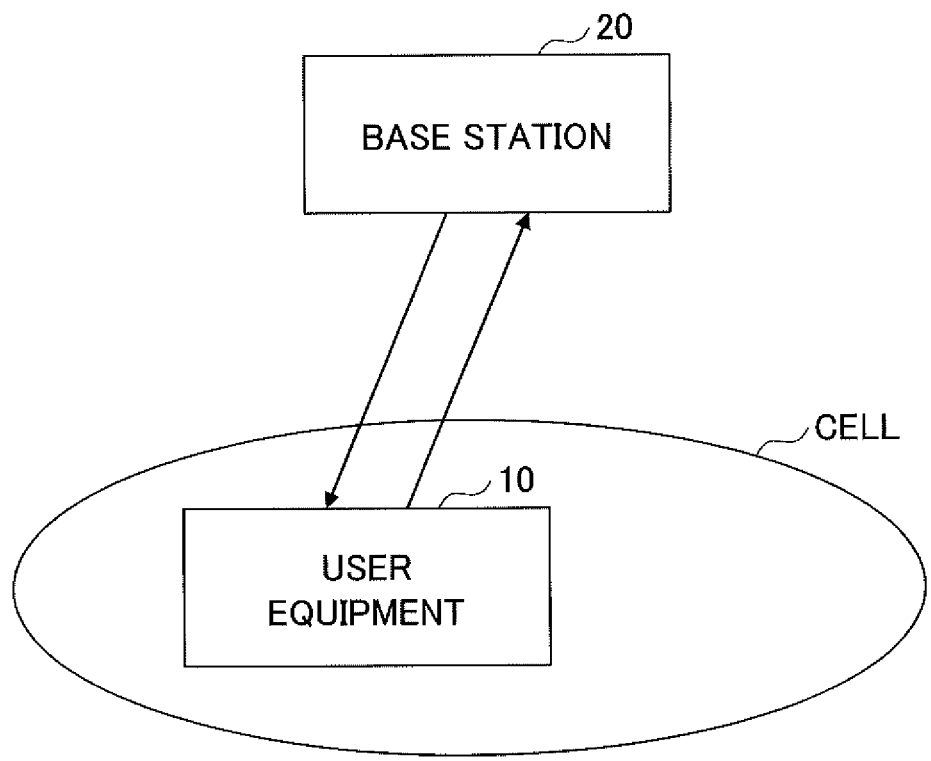
FIG. 2 is a diagram illustrating the configuration of a radio communication system according to an embodiment of the invention.

FIG. 2 is a diagram illustrating the configuration of a radio communication system according to an embodiment of the invention. The radio communication system according to the present embodiment includes a user equipment 10 and a base station 20, as illustrated in FIG. 2.

The user equipment 10 is a communication apparatus that has a radio communication function of a communication module for a smartphone, a mobile phone, a tablet, a wearable terminal, or a machine-to-machine (M2M) and is wirelessly connected to the base station 20 to use various communication services provided by the radio communication system. The base station 20 is a communication apparatus that provides one or more cells and performs radio communication with the user equipment 10. In FIG. 2, one user equipment 10 and one base station 20 are illustrated and, but this is an example. The plurality of user equipments 10 and the plurality of base stations 20 may be used.

In the present embodiment, hybrid automatic repeat request (HARQ) control such as retransmission is performed when the user equipment 10 receives data in a DL direction. Since the HARQ control to be described in the present embodiment is basically the same as HARQ control in LTE, an overview of the HARQ control in LTE will be described.

In a user equipment and a base station in LTE, hybrid ARQ (HARQ) control is performed in an HARQ entity of a media access control (MAC) layer (see Non-Patent Document 1). In HARQ control of downlink data in the user equipment, ACK is returned to the base station when decoding of downlink data (TB: transport block) succeeds, and NACK is returned to the base station when the decoding fails. In the HARQ, when the decoding of received (detected) data fails (when there is an error in the data), the user equipment retains the data (specifically, for example, an LLR), combines data retransmitted from the base station with the retained data (performs soft combining), and decodes the combined data. Thus, strong resistance to an error is allowed. A storage unit (memory region) retaining the data is referred to as a soft buffer. As will be described, in the present embodiment, NACK can also be retransmitted from the base station 20 to the user equipment 10 before NACK is returned from the user equipment 10 to the base station 20.

Figure 1:
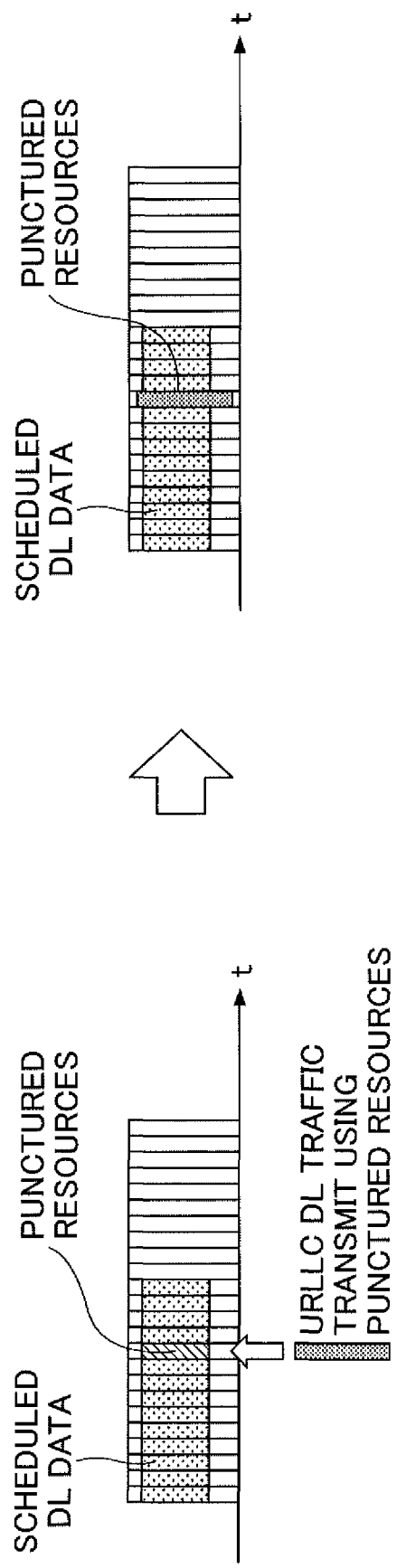
FIG. 1 a diagram illustrating a problem.

In the present embodiment, as illustrated in FIG. 1, the user equipment 10 receives data of eMBB with the resources obtained by puncturing some of the resources by URLLC from the base station 20 in some cases. Accordingly, in the present embodiment, by notifying of information indicating the punctured resources from the base station 20 to the user equipment 10, the user equipment 10 can perform a decoding process or the like in consideration of the fact that the punctured resources are included. Hereinafter, more specific operation examples in the present embodiment will be described in Examples 1 to 5.

Example 1

In Example 1, when the base station 20 punctures some of the resources allocated to the data of the user equipment 10 and transmits the data, the information regarding the punctured resources is included in downlink control information for retransmission (including downlink allocation information (DL assignment) or the like regarding the data retransmission resources). Thus, the user equipment 10 can ascertain which resources are punctured in the previous allocation resources.

Figure 3:
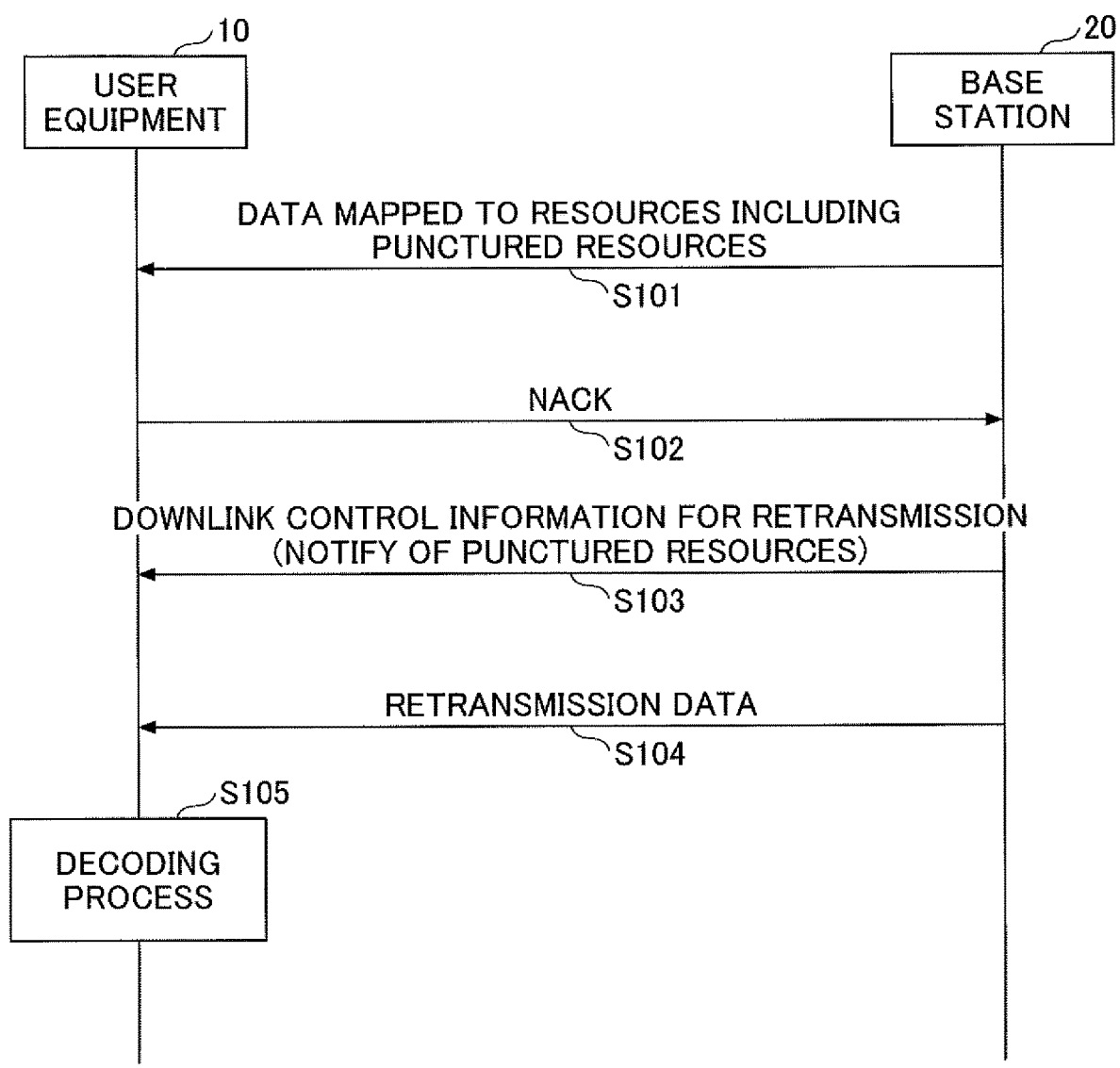
FIG. 3 is a diagram illustrating a process sequence in Example 1.

An example of a process sequence in Example 1 will be described with reference to FIG. 3. As illustrated in FIG. 3, in step S101, the base station 20 transmits data mapped to the resources including the punctured resources and the user equipment 10 receives the data. Here, since there are the punctured resources, it is assumed that the data may not be normally decoded. In step S102, NACK is returned from the user equipment 10 to the base station 20. The transmission of the data in step S101 is not limited to the first transmission of the data, but the data is retransmitted in some cases.

The base station 20 receiving NACK transmits downlink control information (including the information regarding the punctured resources) for retransmission to the user equipment 10 (step S103). In step S104, the retransmission data is transmitted. As will be described below, in the present embodiment, the base station 20 transmitting the data with the resources including the punctured resources can transmit the downlink control information (including the information regarding the punctured resources) for retransmission without receiving a feedback of ACK/NACK (which may be referred to as an HARQ feedback) to the user equipment 10.

In step S105, for example, the user equipment 10 combines data obtained by excluding data corresponding to the punctured resources from the data received in step S101 (the data before the decoding, for example, an LLR stored in the soft buffer) with the data received in the retransmission, and performs a decoding process. For example, the user equipment 10 may combine data obtained by correcting the data (LLR) corresponding to the punctured resources with the data received in the retransmission and may perform the decoding process. In the correction herein, for example, the data is corrected to a value indicating that reliability is low (indicating uncertainty regarding whether the data is 1 or 0). For example, when the punctured resources are large, the data received in step S101 may be dropped and only the retransmission data received in step S104 may be decoded.

Here, an example of the puncturing performed on the side of the base station 20 will be described with reference to FIGS. 4A and 4B. Both of FIGS. 4A and 4B illustrate a case in which "data A, data B, and data C" are transmitted from the base station 20 to the user equipment 10.

Figure 4A:
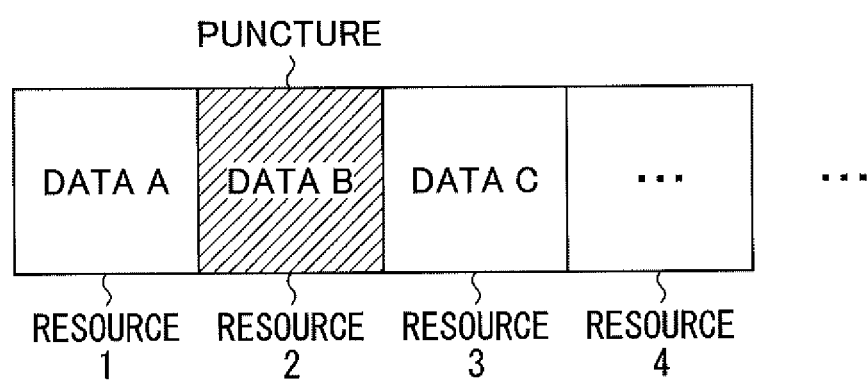
FIG. 4A is a diagram illustrating a puncturing example.

In the case of FIG. 4A, for example, the base station 20 allocates resources 1, 2, and 3 to transmit "the data A, the data B, and the data C" and maps "the data A, the data B, and the data C" to resources 1, 2, and 3. Resource 2 is punctured to transmit URLLC data.

Figure 4B:
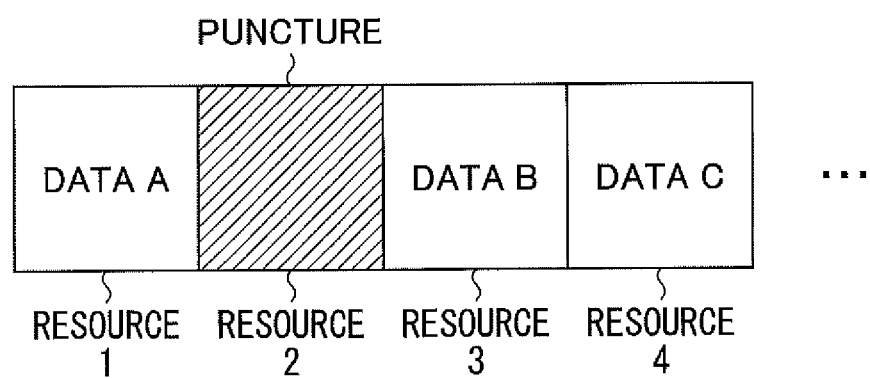
FIG. 4B is a diagram illustrating a puncturing example.

In the case of FIG. 4B, for example, the base station 20 allocates resources 1, 2, and 3 to transmit "the data A, the data B, and the data C," decides not to use resource 2, and does not use resource 2 to transmit "the data A, the data B, and the data C." In this case, resource 2 is used for the URLLC data. However, resource 2 may be set to be untransmitted.

In the present embodiment, either the foregoing case corresponds to puncturing of the resources. The case of FIG. 4B (for example, the case in which the non-transmission is set) may be referred to as rate matching.

As described above, the puncturing in the present embodiment includes not only puncturing of the resources to which data to be transmitted is mapped but also non-mapping of data to be transmitted (rate matching).

According to regulation or configuration, when the user equipment 10 ascertains that the rate matching is performed as puncturing on the side of the base station 20 and when the user equipment 10 receives the information regarding the punctured resources from the base station 20, a reception process may be performed, excluding the resources from DL data resources. As described above, the decoding performed using the data excluding the data corresponding to the punctured resources is an example of the reception process. BLER is improved by performing the reception process in which the rate matching is assumed.

Example 2

Next, Example 2 will be described. In Example 2, when the base station 20 punctures a part of the resources allocated to the data to the user equipment 10 and transmits the data, information regarding the punctured resources is included in downlink control information for transmission of the data (reception from viewpoint of the user equipment 10). Thus, the user equipment 10 can ascertain which resources are punctured in the allocation resources.

An example of a process sequence in Example 2 will be described with reference to FIG. 5. At a time point before step S201 of FIG. 5, the base station 20 is assumed to puncture (or decide to puncture) a part of the resources allocated to the data to be transmitted to the user equipment 10.

Figure 5:
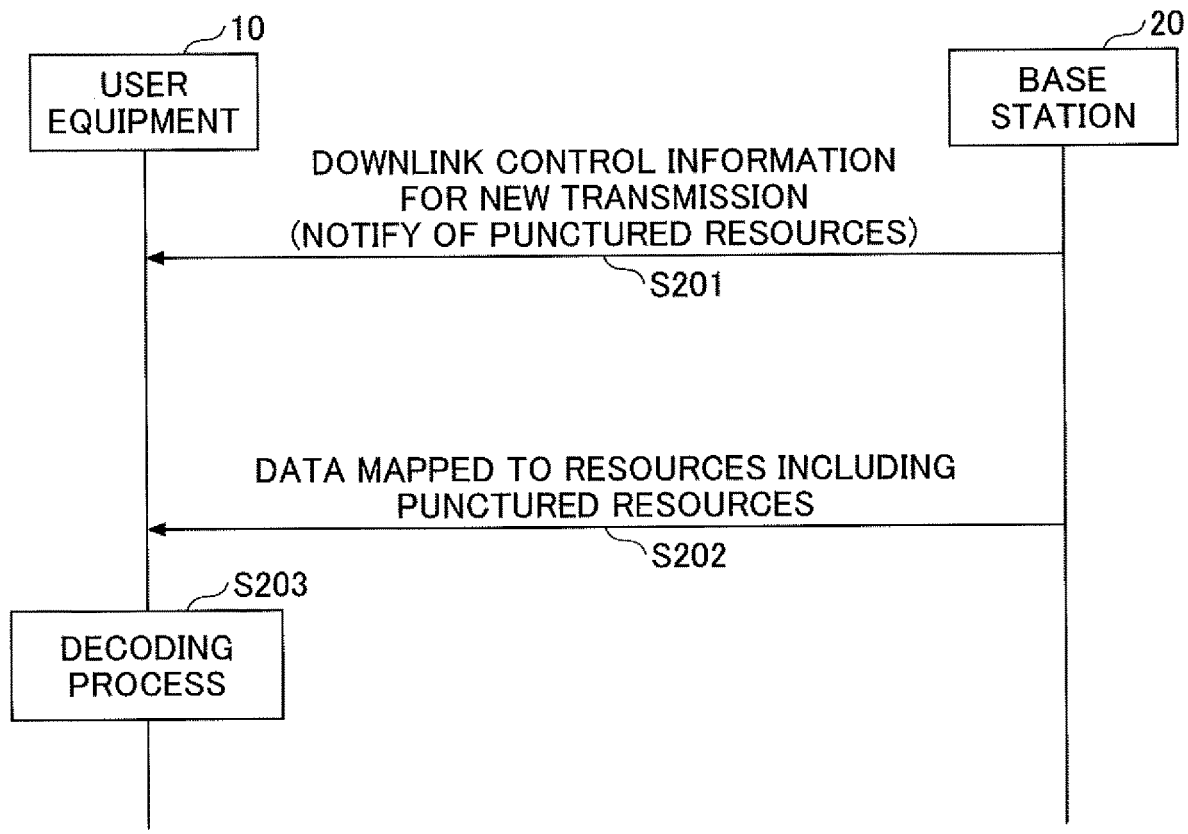
FIG. 5 is a diagram illustrating a process sequence in Example 2.

As illustrated in FIG. 5, in step S201, the base station 20 transmits downlink control information (including information regarding the punctured resources) for new transmission (which may be retransmission) to the user equipment 10. In step S202, the base station 20 transmits the data mapped to the resources including the punctured resources to the user equipment 10. Based on the downlink control information (information or the like regarding the allocation resources) received in step S201, the user equipment 10 receives the data transmitted from the base station 20 (specifically, for example, detects a signal from radio waves and calculates LLR).

In step S203, the user equipment 10 performs decoding using, for example, data excluding the data corresponding to the punctured resources from the data received in step S202 based on the information regarding the punctured resources included in the downlink control information received in step S201. For example, the decoding may be performed with the data obtained by correcting the data (LLR) corresponding to the punctured resources. For example, when the punctured resources are large, the data received in step S202 may be dropped and retransmission may be requested. Only the data corresponding to the punctured resources may be dropped and retransmission of only the data corresponding to the punctured resources may be requested.

(Common Items to Examples 1 and 2)

Figure 6:
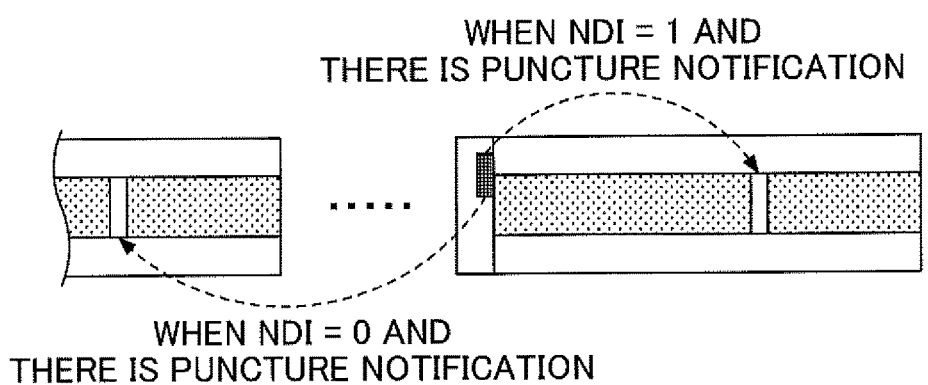
FIG. 6 is a diagram illustrating an example of designation of punctured resources.

FIG. 6 is a diagram illustrating an example of an operation of the user equipment 10 related to designation of the punctured resources in Examples 1 and 2. As illustrated in FIG. 6, when an indicator (NDI: new data indicator) representing retransmission or not is 0 (when the indicator represents retransmission) in the downlink control information and when the punctured resources are notified of, the user equipment 10 performs the above-described decoding process in consideration of the fact that the punctured resources are included in the resources of the previously received data in the same HARQ process as the HARQ process indicated with the downlink control information. On the other hand, when NDI is 1 (when the indicator represents new transmission) in the downlink control information and the punctured resources are notified of, the user equipment 10 performs the decoding process in consideration of the fact that the punctured resources are included in the downlink data resources notified with the downlink control information.

Figure 7:
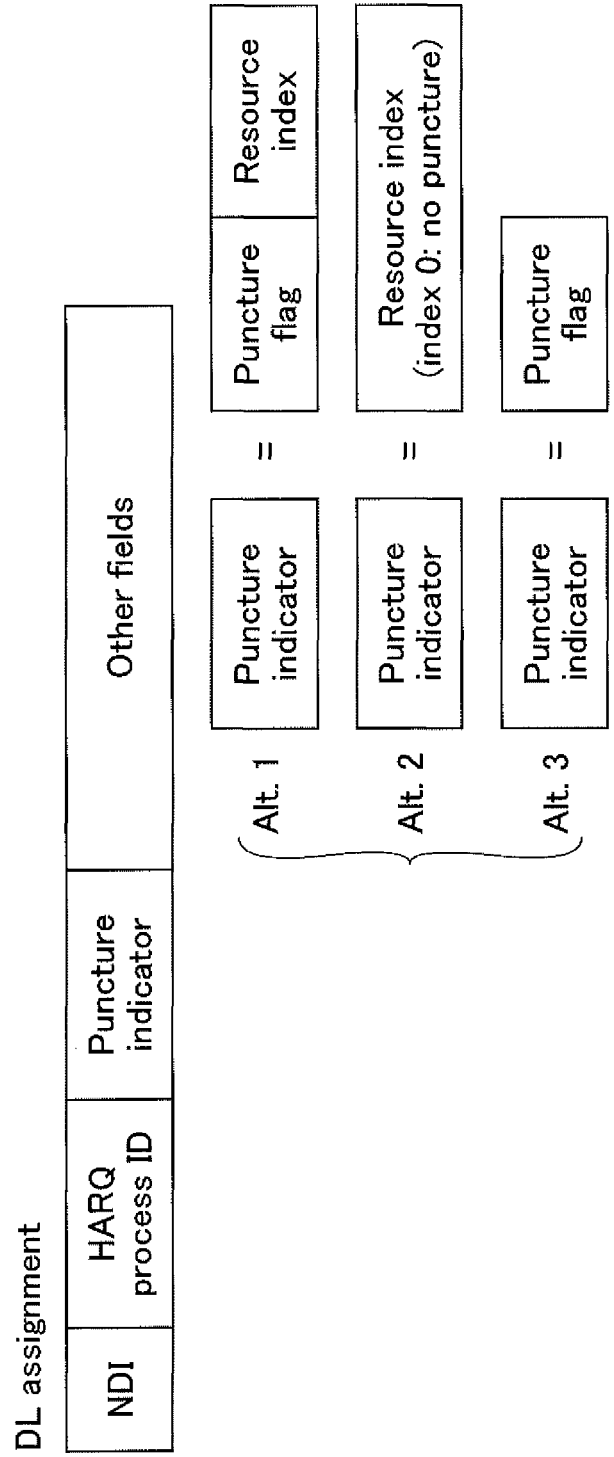
FIG. 7 is a diagram illustrating an example of the configuration of downlink control information (downlink allocation information) in Examples 1 and 2.

FIG. 7 is a diagram illustrating an example of the configuration of the downlink control information in Examples 1 and 2. Since the downlink control information is used to allocate the downlink resources, the downlink control information may also be referred to as downlink allocation information (DL assignment).

As illustrated in FIG. 7, the downlink control information includes not only NDI, an HARQ process ID, and other fields (allocation resource information or the like) but also a puncture indicator for notifying that the punctured resources are included in the allocation resources.

As illustrated in the drawing, the puncture indicator includes, for example, a puncture flag indicating that there is the punctured resource and a resource index indicating which resource is punctured. The puncture indicator may include only the resource index. In this case, for example, when the resource index is 0, the resource index indicates that the resources are not punctured. The puncture indicator may include only the puncture flag.

The user equipment 10 performs, for example, the following operation so that the operation corresponds to the configuration of the downlink control information.

When the user equipment 10 detects that NDI=0 (retransmission) and the resource index is designated with the puncture indicator in the downlink control information received from the base station 20, the user equipment 10 regards the resource indicated with the resource index in the previous allocation resources in the HARQ process of the HARQ process ID notified of with the downlink control information as being punctured. As described above, the decoding process is performed, for example, by correcting the LLR or excluding the LLR corresponding to the punctured resources. Thus, it is possible to minimize deterioration in BLER due to the puncturing.

When the user equipment 10 detects that NDI=1 (new transmission) and the resource index is designated with the puncture indicator in the downlink control information received from the base station 20, the user equipment 10 regards the resource indicated with the resource index in the allocation resources notified of with the downlink control information as being punctured. The decoding process is performed, for example, by correcting the LLR or excluding the punctured resources from the received resources (performing rate matching). Thus, it is possible to minimize deterioration in BLER due to the puncturing.

For example, the user equipment 10 may determine whether the punctured resources are subjected to the rate matching using NDI (for example, when NDI=1, the rate matching is performed). When the base station 20 explicitly notifies the user equipment 10 whether the punctured resources are subjected to the rate matching using the downlink control information, the user equipment 10 may determine whether the punctured resources are subjected to the rate matching using the downlink control information. The user equipment 10 may determine whether the punctured resources are subjected to the rate matching by determining whether the punctured resources are resources at a time an earlier than a time of the downlink control information. Thus, the user equipment 10 can minimize the deterioration in BLER by applying the rate matching as far as possible.

In regard to the designation of the punctured resources by the downlink control information, a time-frequency resource (for example, a resource block or a resource element) may be designated or a time resource (for example, a symbol or a symbol group) may be designated. In regard to the designation of the punctured resources, a code block may be designated using a code block index.

Figure 8:
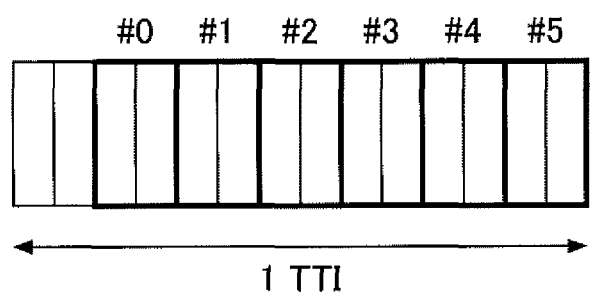
FIG. 8 is a diagram illustrating an example of method of designating punctured resources.

FIG. 8 is a diagram illustrating a case in which the punctured resources are designated with a symbol index or a symbol group index. For example, one TTI in FIG. 8 has 14 symbols (for example, OFDM symbols). When the punctured resources are designated in a symbol unit, an index of the symbol is designated. When the punctured resources are designated in a symbol group unit, an index of the symbol group is designated. For example, when #2 is designated in FIG. 8, #2 indicates that two symbols in the symbol group of #2 include the punctured resources.

When the punctured resources are designated with the symbol index or the symbol group index, for example, the user equipment 10 considers that the resources allocated to the user equipment 10 among all the resources in the designated symbols (or the symbol groups) are punctured. Because of this process, it is not necessary to designate the time-frequency resource in the designation of the punctured resources. Therefore, it is possible to reduce overhead.

The punctured resources notified of with the puncture indicator of the downlink control information may not actually match the punctured resources in the base station 20. The user equipment 10 may recognize information notified of with the puncture indicator of the downlink control information as instruction and assist information for performing a decoding process (for example, performing a decoding process with the corrected LLR) in consideration of the puncturing.

Figure 9:
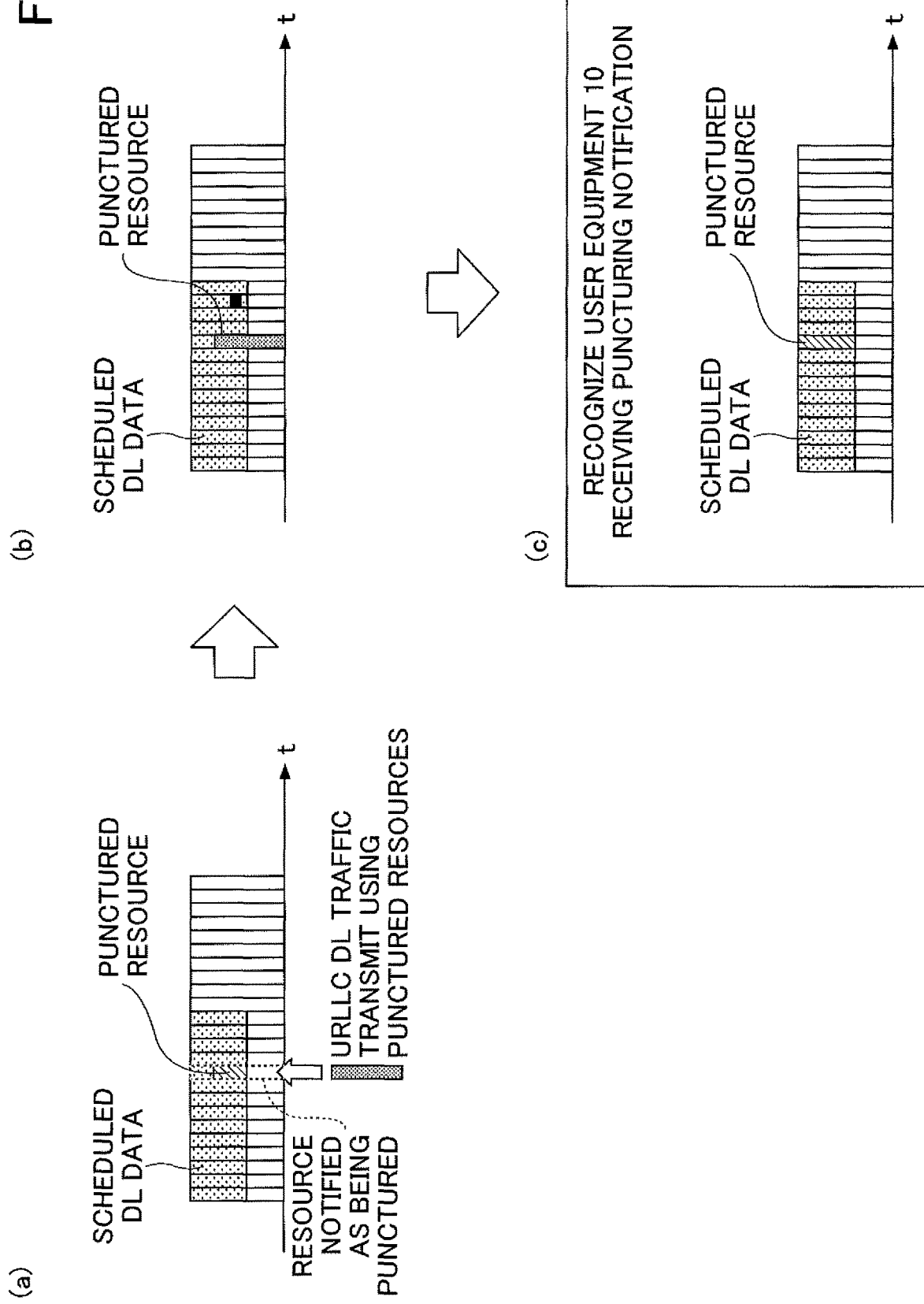
FIG. 9 is a diagram illustrating a relation between resource punctured actually in a base station 20 and recognition in a user equipment 10.

For example, as illustrated in FIGS. 9(a) and 9(b), when a part of the frequency resources of the symbols is punctured in the base station 20, the base station 20 notifies the user equipment 10 of the index of the symbol as the notification of the punctured resources. As illustrated in FIG. 9(c), the user equipment 10 regards all the allocation resources in the symbols as being punctured and performs decoding.

The foregoing example is an example when the resources notified as the punctured resources are greater than actually punctured resources. In contrast, the resources notified as the punctured resources may be smaller than the actually punctured resources. For example, when the actually punctured resources are small, the base station 20 may not notify of the punctured resources.

As indicated in "Alt.3" of FIG. 7, when the puncture indicator does not include the resource index and includes only the puncture flag, for example, when the user equipment 10 ascertain that the corresponding resource is punctured by the puncture flag, for example, the user equipment autonomously detects the punctured resource. The detection can be performed blindly. For example, the base station 20 may notify the user equipment 10 of a modulation scheme (a modulation scheme in the punctured resource) of the data scheduled by interruption along with the puncture indicator by the downlink control information, and the user equipment 10 may detect the punctured resource based on the modulation scheme.

Example 3

Next, Example 3 will be described. The basic processing content of Example 3 is the same as that of Example 1. Example 3 is different from Example 1 in that a redundancy version (RV) is used to designate in which scheduling a resource is punctured. The RV is a value indicating a start point at which a coded bit is extracted in a circular buffer in the base station 20. In LTE of the related art, the value of the RV is included in the downlink control information so that the user equipment 10 is notified of the value of the RV.

Figure 10:
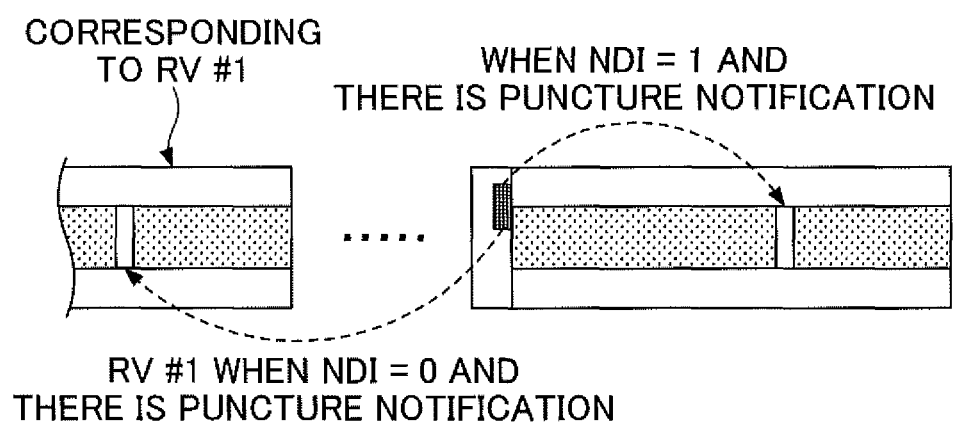
FIG. 10 is a diagram illustrating an operation in Example 3.

In Example 3, for example, as illustrated in FIG. 10, when NDI=0 (retransmission) and RV (for example, RV #1) and the punctured resource are designated with the puncture indicator, the user equipment 10 determines that the designated punctured resource is punctured in the resources in which RV #1 is designated at the time of the scheduling in the HARQ process.

Figure 11:
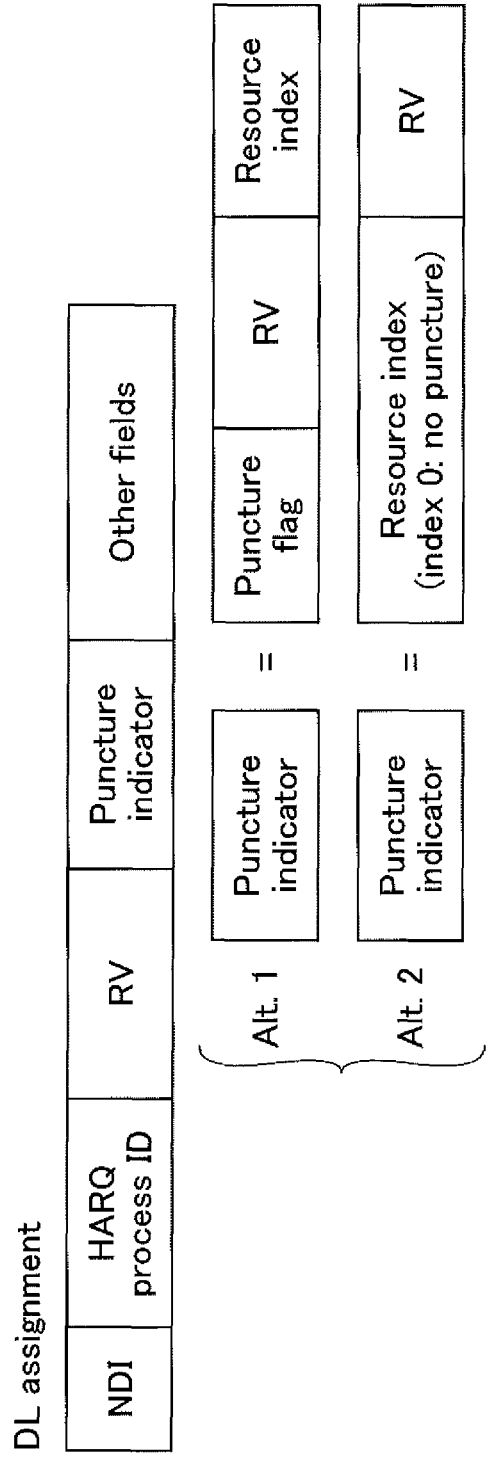
FIG. 11 is a diagram illustrating an example of the configuration of downlink control information (downlink allocation information) in Example 3.

FIG. 11 is a diagram illustrating an example of the configuration of downlink control information (downlink allocation information (DL assignment)) in Example 3.

As illustrated in FIG. 11, the downlink control information includes not only NDI, an HARQ process ID, RV, and other fields (allocation resource information or the like) but also a puncture indicator.

As illustrated in the drawing, the puncture indicator includes, for example, a puncture flag indicating that there is the punctured resource, the above-described RV, and a resource index indicating which resource is punctured. The puncture indicator may include only the resource index and the RV. The resource index may be a symbol index, a symbol group index, or a code block index, as described above.

The user equipment 10 performs, for example, the following operation so that the operation corresponds to the configuration of the downlink control information.

When the user equipment 10 detects that NDI=0 (retransmission) and the resource index and the RV are designated with the puncture indicator in the downlink control information received from the base station 20, the user equipment 10 regards the resource indicated with the resource index in the allocation resources in recent scheduling corresponding to the designated RV in the HARQ process of the HARQ process ID notified of with the downlink control information as being punctured. By notifying of the RV used in the scheduling of the puncture target resource as one piece of information for designating the punctured resource, the user equipment 10 can prevent the LLR correction of erroneous resources due to detection error of the downlink allocation information. That is, by using the RV, it is possible to specify the allocation resource including the punctured resource more reliably.

The base station 20 may not designate the RV for designating the punctured resource with the puncture indicator, but the RV in the downlink allocation information may be RV for designating the punctured resource instead of the scheduling target RV.

When the RV for designating the punctured resource is not designated with the puncture indicator, the user equipment 10 considers the RV in the downlink allocation information as the RV for designating the puncture resource and specifies the punctured resource, as described above. Through the process, it is possible to reduce overhead. In this case, the user equipment 10 regards the RV based on an RV procedure decided in advance in the scheduling target resource as being used and performs a decoding process on scheduling target data.

Example 4

Figure 12:
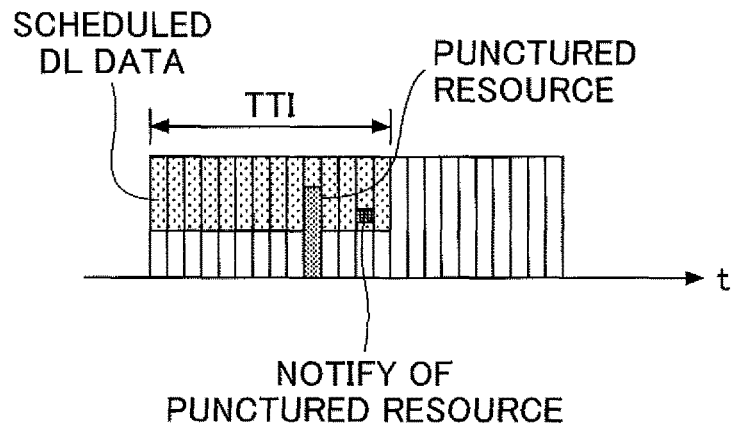
FIG. 12 is a diagram illustrating an operation in Example 4.

Next, Example 4 will be described. In the above-described examples, the punctured resource is notified of with the downlink control information including the downlink allocation information. However, these examples are merely examples. The punctured resource may be notified with different downlink control information from the downlink control information including the downlink allocation information. Thus, for example, the punctured resource can be notified of during the TTI at which the resources including the punctured resource are allocated. An example of this case is illustrated in FIG. 12. The width of the TTI illustrated in FIG. 12 is an example.

As described above, by notifying of the punctured resource during the TTI at which the resources including the punctured resource are allocated, the user equipment 10 can perform the decoding process in consideration of the puncturing early.

In Example 4, the notification of the punctured resource during the TTI at which the resources including the punctured resource are allocated is performed, for example. For example, the punctured resource may be notified at a TTI later than the TTI at which the resources including the punctured resource are allocated.

Figure 13:
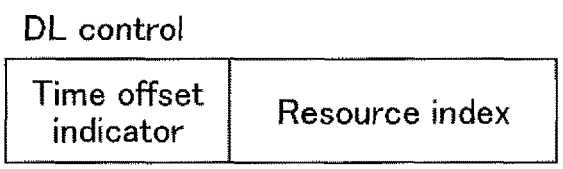
FIG. 13 is a diagram illustrating an example of downlink control information in Example 4.

FIG. 13 is a diagram illustrating an example of the downlink control information when the punctured resource is notified of with different downlink control information from the downlink control information including the downlink allocation information. As illustrated in FIG. 13, the downlink control information includes a time offset indicator and a resource index. The time offset indicator indicates, for example, a time difference from the TTI at which the downlink control information is notified of to the TTI of the resources including the punctured resource. Thus, the user equipment 10 can ascertain the TTI at which the punctured resource is previously present in the resources. The resource index is, for example, an index indicating the position of the resource in the TTI. The TTI may be referred to as a subframe.

As described above, when the punctured resource is notified of with different downlink control information from the downlink control information including the downlink allocation information, the base station 20 may notify of the downlink control information with a UE common search space and/or a UE group search space. In this case, for example, when the user equipment 10 uses identification information (UE common information) regarding the downlink control information and searches for the UE common search space to detect the downlink control information and, for example, the resource designated with the control information is present in the resources allocated to be scheduled to the user equipment 10, the downlink control information is used as information regarding the user equipment 10. In this way, by notifying of the downlink control information with the UE common search space and/or the UE group search space, it is possible to reduce overhead more than when UE specific is notified of the downlink control information.

Example 5

Next, Example 5 will be described. In Example 5, an ACK/NACK (hereinafter referred to as A/N) feedback resource is also notified of by notifying of information indicating that there is the punctured resource described in Examples 1 to 4 (referred to as puncture information).

An example of an operation of the user equipment 10 in Example 5 will be described with reference to FIG. 14. The user equipment 10 receives downlink control information (illustrated as DL assignment) with which allocation of the resources including the punctured resource is performed and receives data (including the punctured resource) with the resources.

Thereafter, the user equipment 10 receives downlink control information, indicated by A in the drawing, (which may be DL assignment or may be different downlink control information from DL assignment) with which puncture information is notified of.

For example, the downlink control information includes information for designating an A/N feedback resource. The user equipment 10 transmits an A/N feedback using a resource designated with the information. The downlink control information may not explicitly include the information for designating the A/N feedback resource, but the A/N feedback resource may implicitly be designated. In this case, for example, the user equipment 10 obtains the A/N feedback resource from a time-frequency resource with which the downlink control information is received. For example, a relation between the A/N feedback resource and the time-frequency resource with which the downlink control information is received is decided, and thus the user equipment 10 decides the A/N feedback resource based on this relation.

Figure 14:
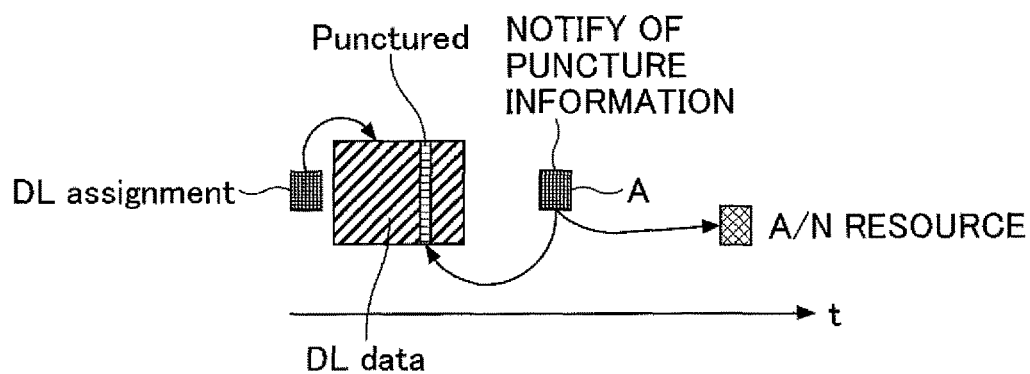
FIG. 14 is a diagram illustrating an operation in Example 5.

When the A/N feedback resource for the DL assignment is already allocated in FIG. 14, the already allocated A/N feedback resource may be overwritten with the A/N feedback resource designated with the downlink control information indicated by A. That is, in this case, A/N transmission in which the already allocated A/N feedback resource is used is not performed.

In FIG. 14, when the base station 20 transmits downlink data with the resources including the punctured resource, the base station 20 may transmit the downlink control information (indicated by A) without receiving NACK from the user equipment 10. The downlink control information may not include resource allocation information of retransmission data or may include the resource allocation information of the retransmission data. When the resource allocation information of the retransmission data is not included, the retransmission data is not transmitted. For example, when NACK is transmitted with the A/N feedback resource illustrated in FIG. 14, the resources of the retransmission data are allocated and the retransmission data is transmitted.

For example, before transmitting A/N feedback in a HARQ process, if the user equipment 10 receives downlink control information (scheduling notification for retransmission) of the same HARQ process once or a plurality of times, the user equipment 10 performs A/N feedback with the A/N feedback resource designated with the last downlink control information.

FIGS. 15A and 15B is a diagram illustrating an example of the configuration of downlink control information (downlink allocation information) in Example 5. FIG. 15A illustrates an example in which information regarding the A/N feedback resource is not included. FIG. 15B illustrates an example when the information regarding the A/N feedback resource is included as the A/N resource indicator.

Figure 16:
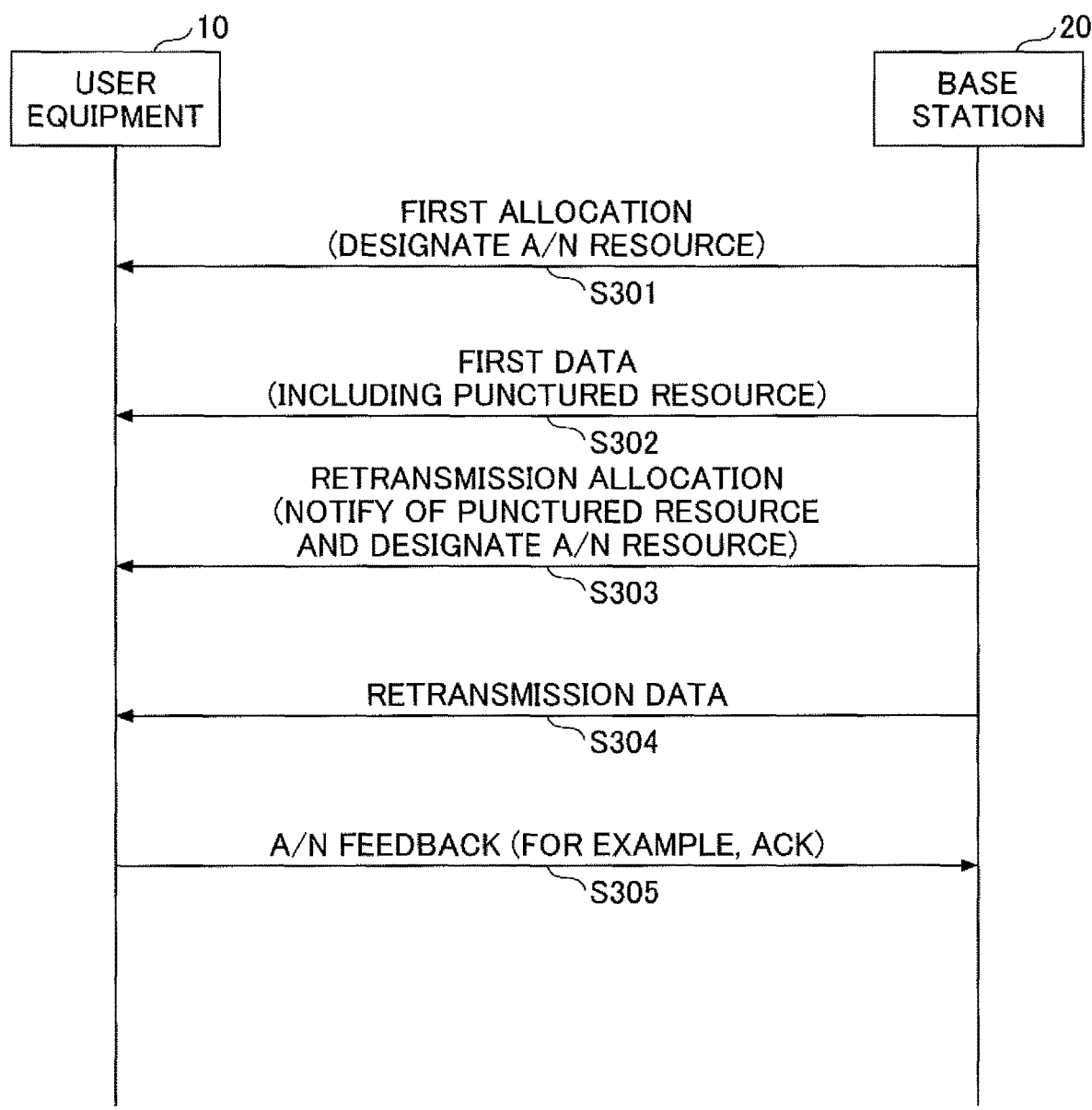
FIG. 16 is a diagram illustrating an example of a process sequence in Example 5.

FIG. 16 illustrates an example of a process sequence in Example 5. In the example illustrated in FIG. 16, in step S301, downlink control information (downlink allocation information) for first transmission including designation of the A/N feedback resource is transmitted from the base station 20 to the user equipment 10. In step S302, first data is transmitted with the resources including the punctured resource.

The base station 20 transmitting the data with the resources including the punctured resource performs notification of the punctured resource and notification of the A/N feedback resource using the downlink control information (the downlink allocation information) for retransmission without receiving A/N from the user equipment 10 and performs retransmission (steps S303 and S304). The user equipment 10 does not perform A/N transmission by the A/N feedback resource received in step S301 by overwriting information regarding the A/N feedback resource received in step S301 with information regarding the A/N feedback resource received in step S303.

For example, the user equipment 10 successfully performs decoding by performing LLR correction and the decoding process on the first data using the information regarding the punctured resource and returns ACK (step S305).

In FIG. 16, when the user equipment 10 successfully performs the decoding before reception of the retransmission data by performing the decoding process on the first data based on the notification of the punctured resource received in step S303, ACK can be returned before reception of the retransmission data. In this case, the base station 20 may not transmit the retransmission data.

In Example 5, an offset value of the A/N feedback resource may be notified with the downlink control information. The offset value is notified as, for example, a value of the A/N resource indicator illustrated in FIG. 15B. When the downlink control information does not include the A/N resource indicator, for example, the user equipment 10 can decide an offset value based on the time-frequency resource with which the downlink control information is received.

Figure 17:
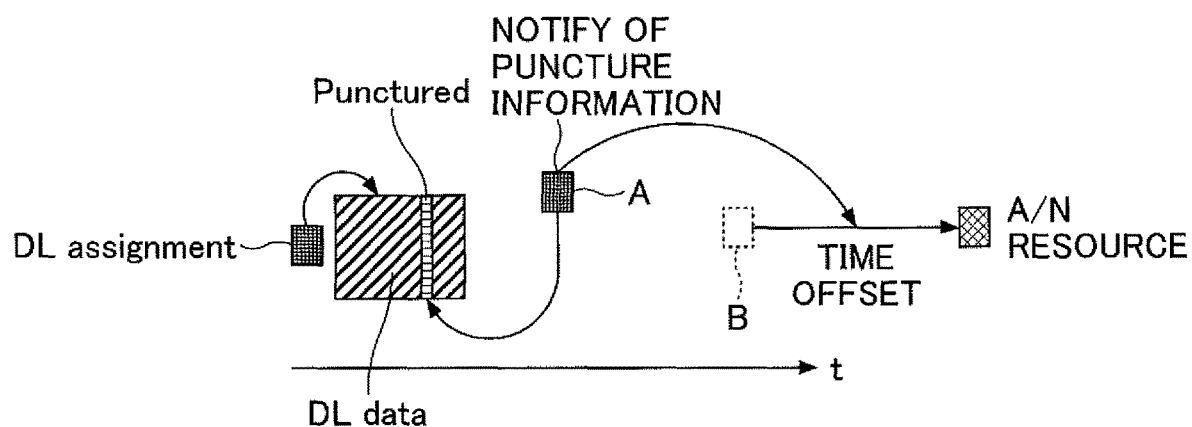
FIG. 17 is a diagram illustrating an operation when an offset value is notified of in Example 5.

An example of an operation when the offset value is notified of will be described with reference to FIG. 17. The user equipment 10 receives the downlink control information (illustrated as DL assignment) with which the resources including the punctured resource are allocated and receives data with the resources (including the punctured resource). For example, the downlink control information includes information regarding the A/N resource indicated by B in the drawing. Alternatively, the information regarding the A/N resource indicated by B in the drawing is implicitly designated by the time-frequency resource of the downlink control information.

Thereafter, the user equipment 10 receives the downlink control information, indicated by A in the drawing, with which the puncture information is notified. The downlink control information includes an offset value (an offset value by which a time of the A/N feedback is delayed) of the A/N feedback resource. The user equipment 10 transmits A/N using the A/N feedback resource at a time position later by the time of the offset value than the time position of the A/N feedback resource indicated by B.

The downlink control information may include information indicating that the A/N feedback is suppressed. An example of an operation in this case will be described with reference to FIG. 18.

The user equipment 10 receives the downlink control information (indicated by A) with which the resources including the punctured resource are allocated and receives data with the resources (including the punctured resource). For example, the downlink control information indicated by A includes information regarding the A/N resource indicated by C in the drawing. Alternatively, the information regarding the A/N resource indicated by C in the drawing is implicitly designated by the time-frequency resource of the downlink control information.

Thereafter, the user equipment 10 receives downlink control information (DL assignment), indicated by B in the drawing, with which the puncture information is notified without transmitting A/N for the first data. The downlink control information includes information for designating an A/N feedback resource indicated by D. The downlink control information includes an instruction to suppress the A/D feedback with the A/N feedback resource indicated by C. Alternatively, instead of including an explicit instruction, when the user equipment 10 receives the downlink control information without transmitting A/N, the user equipment 10 may regard the downlink control information as notification for suppressing the A/N feedback with the already designated A/N feedback resource.

Figure 18:
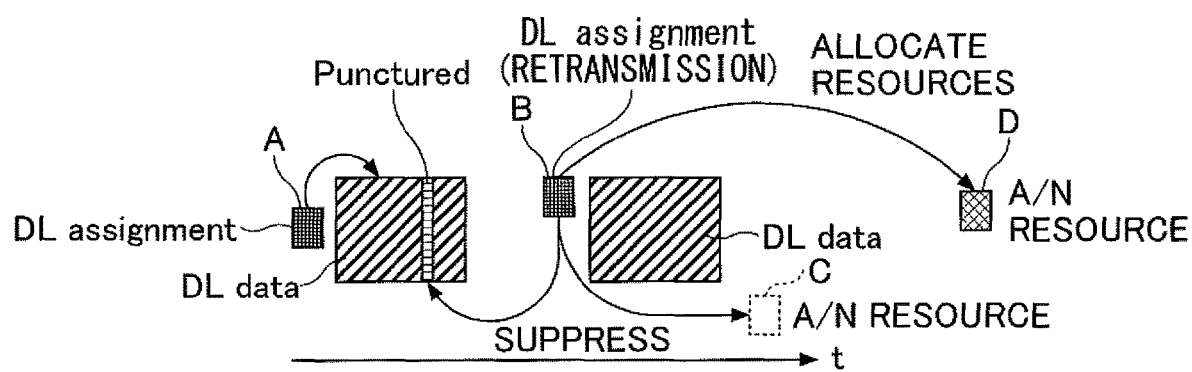
FIG. 18 is a diagram illustrating an operation when A/N feedback suppression notification is performed in Example 5.

By the foregoing instruction/notification, the user equipment 10 does not perform the A/N feedback with a resource indicated by C and performs the A/N feedback with a resource indicated by D. FIG. 18 illustrates an example in which the downlink control information for retransmission is received only once. However, the downlink control information for retransmission (including an A/N suppression instruction) is received a plurality of times in some cases. In this case, the user equipment 10 transmits the A/N feedback using the A/N feedback resource designated with the finally received downlink control information.

In the foregoing example, only NACK may be suppressed and ACK may not be suppressed. Even when the puncture information is not notified of with the downlink control information, the suppression of the A/N feedback may be applied. Thus, when retransmission of a plurality of times is scheduled without waiting for the A/N feedback, unnecessary A/N feedback can be suppressed.

When the user equipment 10 feeds A/N of a plurality of transport blocks (TBs) back with the same A/N feedback resource, the suppression and the offset of the A/N feedback may not be applied even when the puncture information is notified of in regard to a certain TB. By not applying the suppression and the offset of the A/N feedback, it is possible to prevent an influence of the puncture TB on the other TBs.

Even when A/Ns of the plurality of TBs are fed back with the same A/N feedback resource, the suppression and/or the offset of the A/N feedback may be applied when the punctured resource is included in all the TBs.

Figure 19:
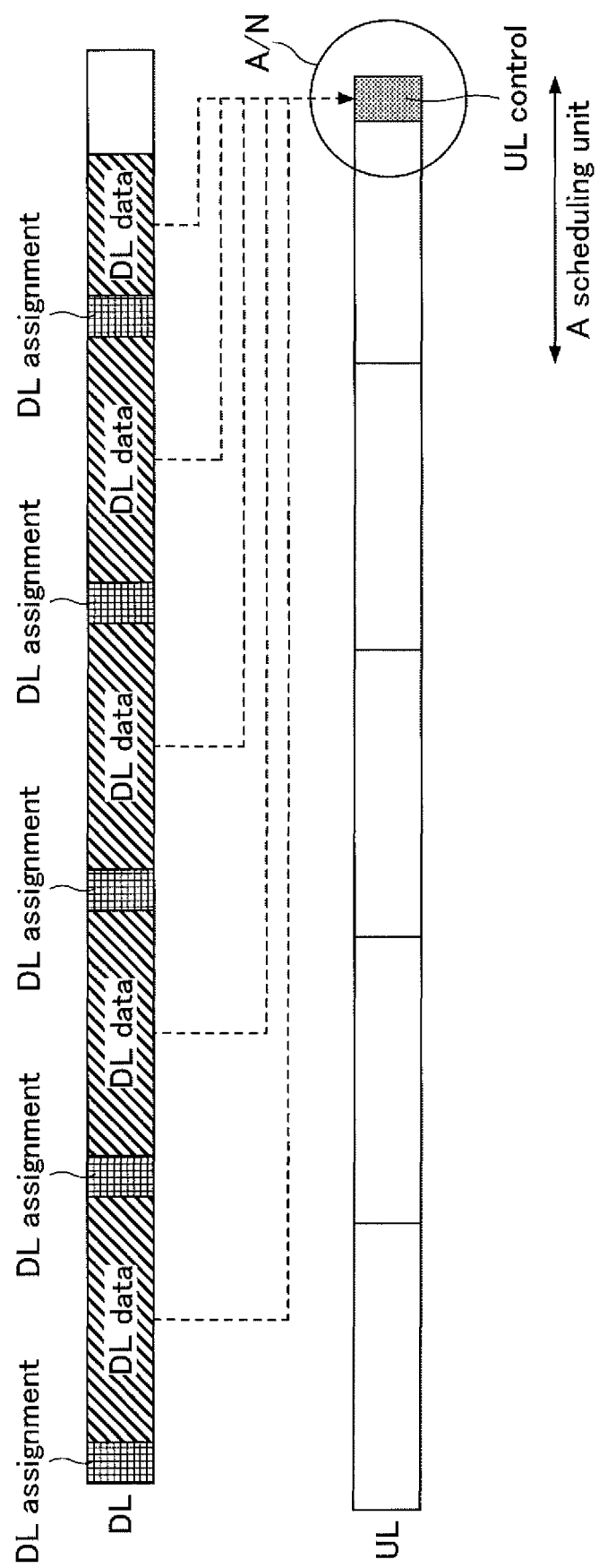
FIG. 19 is a diagram illustrating an operation when A/N feedback suppression notification is performed in Example 5.

An example when A/N of the plurality of TBs is fed back with the same A/N feedback resource is illustrated in FIG. 19. In the example illustrated in FIG. 19, A/N for five TBs is multiplexed or bundled to be transmitted. The multiplexing is a mode in which each A/N equivalent to the plurality of TBs is transmitted. The bundling is, for example, a mode in which AND for A/Ns for the plurality of TBs is transmitted.

When A/Ns of the plurality of TBs are bundled to be fed back, the user equipment 10 may regard the TB with which the downlink control information for retransmission (including the puncture information) is notified as ACK and may perform feedback. Thus, it is possible to prevent all the TBs from being reported as NACK due to an influence of the TB including the punctured resource. In regard to the TB including the punctured resource, the base station 20 can determine A/N with A/N feedback using an A/N resource designated with the downlink control information for retransmission.

Through the process in Example 5 described above, the user equipment 10 can ensure a time in which the decoding process is performed again based on the puncture information. When CRC check is passed (ACK is obtained), necessity to transmit NACK can be eliminated. ACK can also be fed back without retransmission.

(Apparatus Configuration)

Examples of functional configurations of the user equipment 10 and the base station 20 performing operations according to the above-described embodiments will be described. Each of the user equipment 10 and the base station 20 has all of the functions described in the present embodiment (including Examples 1 to 5). Here, each of the user equipment 10 and the base station 20 may have only some of all the functions described in the present embodiment.

<User Equipment 10>

Figure 20:
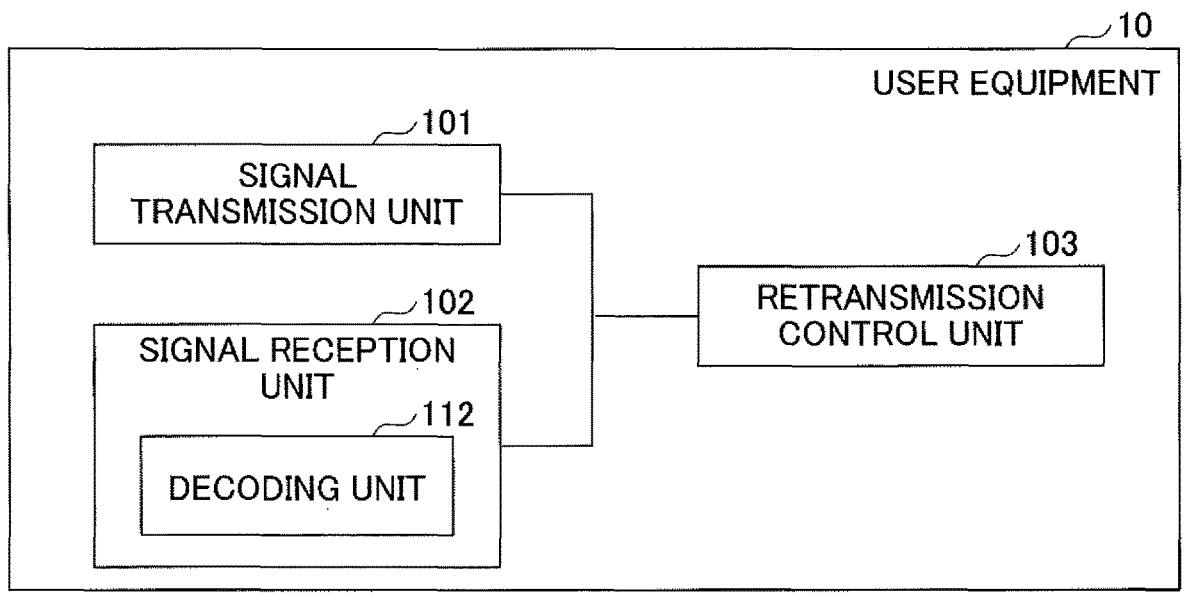
FIG. 20 is a diagram illustrating an example of a functional configuration of the user equipment 10.

FIG. 20 is a diagram illustrating an example of a functional configuration of the user equipment 10. As illustrated in FIG. 20, the user equipment 10 includes a signal transmission unit 101, a signal reception unit 102, and a retransmission control unit 103. The signal reception unit 102 includes a decoding unit 112. The functional configuration illustrated in FIG. 20 is merely an example. Any function division and any name of each functional unit may be used as long as the operations according to the present embodiment can be performed. For example, the decoding unit 112 may be included out of the signal reception unit 102. The decoding unit 112 may be included inside the retransmission control unit 103. A function of the retransmission control unit 103 may be included in the signal transmission unit 101 and/or the signal reception unit 102.

The signal transmission unit 101 is configured to generate a signal of a lower layer from information of a higher layer and transmit wirelessly the signal.

The signal reception unit 102 is configured to wirelessly receive various signals and acquire information of a higher layer from the received signals. The decoding unit 112 has, for example, a function of calculating LLR of each bit from a signal detected from radio waves and a function of a turbo decoder obtaining decoded data using LLR.

The retransmission control unit 103 has, for example, a function of generating HARQ feedback information based on whether decoding succeeds in the decoding unit 112 and transmitting HARQ feedback information from the signal transmission unit 101.

For example, the signal reception unit 102 receives control information including puncture information indicating that there is a punctured resource in resources allocated to the user equipment 10 from the base station 20. The decoding unit 112 performs a process of decoding the data received with the allocated resources from the base station 20 using the puncture information included in the control information received by the signal reception unit 102.

For example, the signal transmission unit 101 has a function of transmitting the HARQ feedback. The control information received by the signal reception unit 102 explicitly or implicitly includes resource designation information indicating resources for transmitting the HARQ feedback. The signal transmission unit 101 does not transmit the HARQ feedback with an HARQ feedback transmission resource designated before reception of the control information and transmits the HARQ feedback using a resource designated using the resource designation information. The resource designation information may be a time offset for the HARQ feedback transmission resource designated before the reception of the control information. In this case, the signal transmission unit 101 can transmit the HARQ feedback using a resource for which the HARQ feedback transmission resource is delayed by the time offset.

<Base Station 20>

Figure 21:
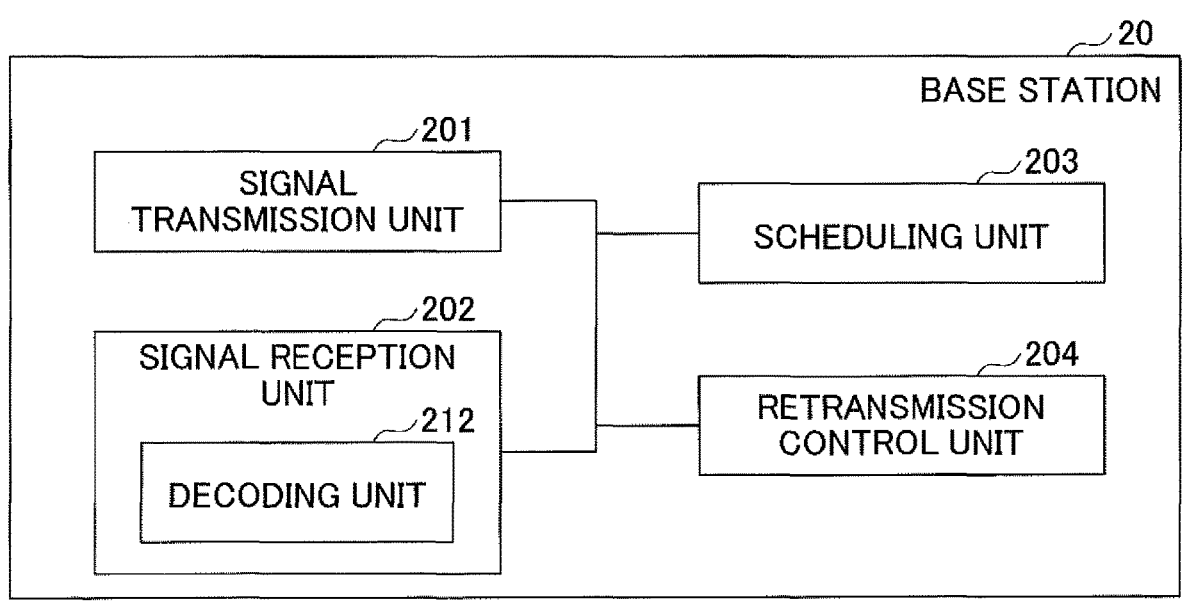
FIG. 21 is a diagram illustrating an example of a functional configuration of the base station 20.

FIG. 21 is a diagram illustrating an example of a functional configuration of the base station 20. As illustrated in FIG. 21, the base station 20 includes a signal transmission unit 201, a signal reception unit 202, a scheduling unit 203, and a retransmission control unit 204. The signal reception unit 202 includes a decoding unit 212.

The functional configuration illustrated in FIG. 21 is merely an example. Any function division and any name of each functional unit may be used as long as the operations according to the present embodiment can be performed. The decoding unit 212 may be included inside the retransmission control unit 204. The function of the retransmission control unit 204 may be included in the signal transmission unit 201 and/or the signal reception unit 202.

The signal transmission unit 201 is configured to generate a signal of a lower layer from information of a higher layer and wirelessly transmit the signal. The signal reception unit 202 is configured to wirelessly receive various signals and acquire information of a higher layer from the received signals. The decoding unit 212 has, for example, a function of calculating LLR of each bit from a signal detected from radio waves and a function of a turbo decoder obtaining decoded data using LLR.

The scheduling unit 203 allocates the resources to the user equipment 10. For example, the retransmission control unit 204 determines whether to perform retransmission based on the HARQ feedback received from the user equipment 10. When the retransmission is performed, the retransmission control unit 204 instructs the signal transmission unit 201 to retransmit the data in the corresponding HARQ process.

<Hardware Configuration>

As described above, the block diagrams (FIGS. 20 and 21) used to describe the functional configurations according to the foregoing embodiment illustrate blocks of functional units. The functional blocks (constituent elements) are realized by any combination of hardware and/or software. In addition, means for realizing each functional block is not particularly limited. That is, each functional block may be realized by one device in which a plurality of elements are combined physically and/or logically or may be realized by two or more devices that are physically and/or logically separated by connecting the plurality of devices directly and/or indirectly (for example, in a wired and/or wireless manner).

Figure 22:
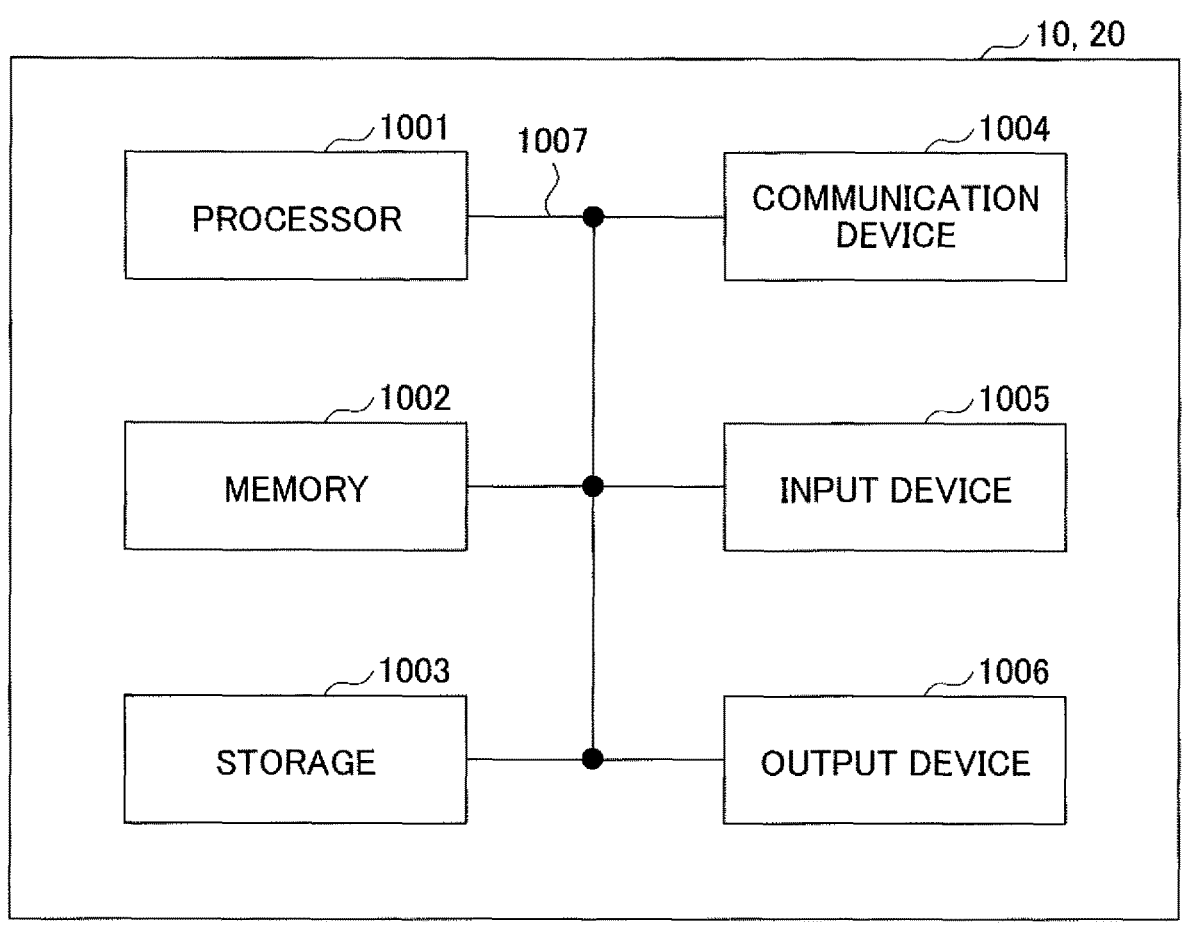
FIG. 22 is a diagram illustrating an example of a hardware configuration of the user equipment 10 and the base station 20.

For example, the user equipment 10 and the base station 20 according to an embodiment of the invention may function as a computer that performs a process for a radio communication method according to the invention. FIG. 22 is a block diagram illustrating a hardware configuration of the user equipment 10 and the base station 20 according to an embodiment of the invention. The above-described user equipment 10 and the base station 20 may be physically configured as a computer apparatus that includes a processor 1001, a memory 1002, a storage 1003, a communication device 1004, an input device 1005, an output device 1006, and a bus 1007.

In the following description, a term "apparatus" can be replaced with a circuit, a device, a unit, or the like. The hardware configuration of user equipment 10 and the base station 20 may be configured to one device or a plurality of devices denoted by Reference Numerals 1001 to 1006 illustrated in the drawing or may be configured not to include some of the devices.

The functions of the user equipment 10 and the base station 20 are realized by reading predetermined software (program) on hardware such as the processor 1001 or the memory 1002 so that the processor 1001 can perform an arithmetic operation and controlling communication by the communication device 1004 and reading and/or writing of data in the memory 1002 and the storage 1003.

For example, the processor 1001 controls the entire computer by operating an operating system. The processor 1001 may also be configured as a central processing unit (CPU) that includes an interface with a peripheral device, a control device, an arithmetic device, and a register.

The processor 1001 reads a program (program codes), a software module, or data from the storage 1003 and/or the communication device 1004 to the memory 1002 and performs various processes according to the program, the software module, or the data. As the program, a program causing a computer to perform at least some of the operations described in each of the foregoing embodiment is used. For example, the signal transmission unit 101, the signal reception unit 102, the decoding unit 112, and the retransmission control unit 103 of the user equipment 10 illustrated in FIG. 20 may be realized by a control program that is stored in the memory 1002 and is operated by the processor 1001. For example, the signal transmission unit 201, the signal reception unit 202, the scheduling unit 203, a decoding unit 212, and a retransmission control unit 204 of the base station 20 illustrated in FIG. 21 may be realized by a control program that is stored in the memory 1002 and is operated by the processor 1001. The above-described various processes performed by one processor 1001 have been described, but may be performed simultaneously or sequentially by two or more processors 1001. The processor 1001 may be mounted on one or more chips. The program may be transmitted from a network via an electric communication circuit.

The memory 1002 is a computer-readable recording medium and may be configured by at least one of, for example, a read-only memory (ROM), an erasable programmable ROM (EPROM), an electrically erasable programmable ROM (EEPROM), and a random access memory (RAM). The memory 1002 may also be referred to as a register, a cache, a main memory (main storage device), or the like. The memory 1002 can store a program (program codes), a software module, or the like which can be executed to perform a process according to an embodiment of the invention.

The storage 1003 is a computer-readable recording medium and may be configured by at least one of, for example, an optical disc such as a compact disc ROM (CD-ROM), a hard disk drive, a flexible disc, a magneto-optical disc (for example, a compact disc, a digital versatile disk, a Blu-ray (registered trademark) disc), a smart card, a flash memory (for example, a card, a stick, or a key drive), a floppy (registered trademark) disk, and a magnetic script. The storage 1003 may also be referred to as an auxiliary storage device. The above-described storage medium may be, for example, a database or a server including the memory 1002 and/or the storage 1003 or another appropriate medium.

The communication device 1004 is hardware (a transmission and reception device) that performs communication between computers via a wired and/or wireless network and is also referred to as, for example, a network device, a network controller, a network card, or a communication module. For example, the signal transmission unit 101 and the signal reception unit 102 of the user equipment 10 may be realized by the communication device 1004. The signal transmission unit 201 and the signal reception unit 202 of the base station 20 may be realized by the communication device 1004.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs an output to the outside. The input device 1005 and the output device 1006 may be configured to be integrated (for example, a touch panel).

The devices such as the processor 1001 and the memory 1002 are connected to the bus 1007 communicating information. The bus 1007 may be configured as a single bus or may be configured by different buses between the devices.

The user equipment 100 and the base station 200 may be configured to include hardware such as a microprocessor, a digital signal processor (DSP), an application specific integrated circuit (ASIC), a programmable logic device (PLD), or a field programmable gate array (FPGA), or some or all of the functional blocks may be realized by the hardware. For example, the processor 1001 may be mounted as at least one of the hardware.

Conclusion of Embodiments

As described above, according to the present embodiment, there is provided a communication apparatus in a radio communication system. The communication apparatus includes: a reception unit configured to receive control information including puncture information which indicates a puncture resource in resources allocated to the communication apparatus from another communication apparatus; and a decoding unit configured to decode data received from the other communication apparatus in the allocated resources. The decoding unit performs the decoding using the puncture information included in the control information received by the reception unit.

In the foregoing configuration, even when some of the resources allocated for data reception in the communication apparatus are punctured, the communication apparatus can appropriately acquire the data transmitted from the other communication apparatus.

The control information received by the reception unit is, for example, control information transmitted from the other communication apparatus to notify of the allocated resources or control information transmitted from the other communication apparatus to retransmit data transmitted with the allocated resources.

In the foregoing configuration, when the control information received by the reception unit is the control information transmitted from the other communication apparatus to notify of the allocated resources, the communication apparatus can detect the punctured resource quickly. When the control information received by the reception unit is the control information transmitted from the other communication apparatus to retransmit the data transmitted with the allocated resources, for example, the communication apparatus can ascertain that the resource of the data received in previous scheduling is punctured, and thus can quickly perform a decoding process in consideration of the puncturing.

The puncture information includes information for specifying the puncture resource and the decoding unit specifies the puncture resource in the resources using the information.

In this configuration, it is possible to specify the punctured resource quickly and accurately.

The communication apparatus may further include a transmission unit configured to transmit an HARQ feedback. The control information received by the reception unit may explicitly or implicitly include resource designation information indicating a resource for transmitting the HARQ feedback. The transmission unit may not transmit the HARQ feedback with an HARQ feedback transmission resource designated before reception of the control information and transmits the HARQ feedback using a resource designated using the resource designation information. In this configuration, for example, it is possible to prevent transmission of unnecessary NACK.

The communication apparatus may further include a transmission unit configured to transmit an HARQ feedback. The control information received by the reception unit may explicitly or implicitly include a time offset. The transmission unit may not transmit the HARQ feedback with an HARQ feedback transmission resource designated before reception of the control information and transmits the HARQ feedback using a resource for which the HARQ feedback transmission resource is delayed by the time offset. In this configuration, for example, it is also possible to prevent transmission of unnecessary NACK.

Conclusion of Embodiments

The embodiments of the invention have been described above, but the disclosed invention is not limited to the embodiments. Those skilled in the art can understand various modifications, corrections, substitutions, replacements, and the like. To promote understanding of the invention, the description has been made using examples of specific numerical values. These numerical values are merely examples and any appropriate values may be used unless otherwise stated. The classification of the items in the foregoing description are not fundamental, but matters described in two or more items may be combined to be used as necessary or matters described in any item may be applied to matters described in other items (unless the matters are inconsistent). The boundaries of the functional units or the processing units in the functional block diagrams may not necessarily correspond to the boundaries of physical components. Operations of the plurality of functional units may be performed physically by one component or an operation of one functional unit may be performed physically by a plurality of components. The process procedures described in the embodiments may be switched to a procedure of the processes without being inconsistent. To facilitate the description of the processes, the user equipment 10 and the base station 20 have been described with reference to the functional block diagrams, but the devices may be realized hardware, software, or a combination thereof. Software operated by the processor included in the user equipment 10 according to the embodiments of the invention and software operated by the processor included in the base station 20 according to the embodiments of the invention may each be stored in any other appropriate storage medium such as a random access memory (RAM), a flash memory, a read-only memory (ROM), an EPROM, an EEPROM, a register, a hard disk (HDD), a removable disk, a CD-ROM, a database, and a server.

The notification of information is not limited to the aspects/embodiments described in the present specification and may be performed in accordance with other methods. For example, the notification of information may be performed with physical layer signaling (for example, downlink control information (DCI) or uplink control information (UCI)), higher layer signaling (for example, radio resource control (RRC) signaling, medium access control (MAC) signaling, or broadcast information (master information block (MIB), or a system information block (SIB))), another signal, or a combination thereof. The RRC signaling may be referred to as an RRC message or may be referred to as, for example, an RRC connection setup message or an RRC connection reconfiguration message.

Each aspect/embodiment described in the present specification may be applied to a system in which Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other appropriate systems are used and/or to a next generation system extended based on the system.

The order of the process procedure, the sequence, the flowchart, or the like of each aspect/embodiment described in the present specification may be interchanged unless there is contradiction. For example, in the method described in the present specification, elements of various steps have been proposed in exemplary orders and the invention is not limited to the proposed specific orders.

In the present specification, a specific operation performed by the base station 20 is also performed further by an upper node depending on a case. In a network formed by one network node or a plurality of network nodes including the base station 20, it should be apparent that various operations performed to communicate with the user equipment 10 are considered to be able to be performed by the base station 20 and/or another network node (for example, an MME or an S-GW is considered, but the invention is not limited thereto) other than the base station 20. The case in which the number of other network nodes other than the base station 20 is 1 has been exemplified above, but a combination of a plurality of other network nodes (for example, an MME and an S-GW) may be used.

Each aspect/embodiment described in the present specification may be used alone, may be used in combination, or may be switched to be used in association with execution.

The user equipment 10 is referred to as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agency, a mobile client, a client, or several other appropriate terms by those skilled in the art.

The base station 20 is referred to as a nodeB (NB), an enhanced Node (eNB), a base station, or any of the several other appropriate terms by those skilled in the art.

The term "determining" used in the present specification includes a wide variety of operations in some cases. The "determining" can include cases in which performing, for example, judging, calculating, computing, processing, deriving, investigating, looking up (for example, looking up in a table, a database, or another data structure), and ascertaining is considered to perform "determining." In addition, the "determining" can include cases in which performing, for example, receiving (for example, receiving information), transmitting (for example, transmitting information), inputting, outputting, and accessing (for example, accessing data in a memory) is considered to perform "determining." In addition, the "determining" can include cases in which performing, for example, resolving, selecting, choosing, establishing, and comparing is considered to be perform "determining." That is, the "determining" can include a case in which any operation is considered to perform "determining."

The description "based on" used in the present specification does not imply "based on only" as long as otherwise mentioned. In other words, the description of "based on" implies both of "based on only" and "based on at least."

The terms "include" and "including" are intended to be general as in the term "comprising" as long as "include" and "including," and modifications thereof are used in the present specification or the claims. Further, the term "or" used in the present specification or the claims is intended not to be exclusive OR.

Throughout the present disclosure, for example, when the article such as a, an, and the in English is added in translation, the article is assumed to include plurality unless indicated that the article is not clear in a context.

The invention has been described in detail above, it should be apparent to those skilled in the art that the invention is not limited to the embodiments described in the present specification. The invention can be embodied in correction and change aspects without departing from the gist and scope of the invention described in the claims. Accordingly, the description of the present specification is intended to describe examples and does not have meanings limited to the invention.

This application claims the benefit of Japanese Priority Patent Application JP 2016-221964 filed Nov. 14, 2016, and the entire contents of the Patent Application JP 2016-221964 are incorporated herein by reference.

EXPLANATIONS OF LETTERS OR NUMERALS 10 user equipment
101 signal transmission unit
102 signal reception unit
112 decoding unit
103 retransmission control unit
20 base station
201 signal transmission unit
202 signal reception unit
212 decoding unit
203 scheduling unit
204 retransmission control unit
1001 processor
1002 memory
1003 storage
1004 communication device
1005 input device
1006 output device

The invention claimed is:

1. A terminal comprising:
a receiver that receives downlink control information including resource assignment information, rate matching information, and information indicating initial transmission or retransmission; and
a processor that determines that a resource indicated by the rate matching information is not available for data reception,
wherein the rate matching information included in the downlink control information indicates resources not available for data reception in units of symbols, and
wherein the rate matching information indicates non-mapping of data to be transmitted in the resources.

2. The terminal as claimed in claim 1, wherein the rate matching information indicates resources not available for data reception in units of symbol groups.

3. A system comprising:
- a terminal comprising:
  - a receiver that receives downlink control information including resource assignment information, rate matching information, and information indicating initial transmission or retransmission; and
  - a processor that determines that a resource indicated by the rate matching information is not available for data reception, and
- a base station comprising:
  - a transmitter that transmits the downlink control information,
- wherein the rate matching information included in the downlink control information indicates resources not available for data reception in units of symbols, and
- wherein the rate matching information indicates non-mapping of data to be transmitted in the resources.

4. A reception method performed by a terminal comprising:
- receiving downlink control information including resource assignment information, rate matching information, and information indicating initial transmission or retransmission; and
- determining that a resource indicated by the rate matching information is not available for data reception,
- wherein the rate matching information included in the downlink control information indicates resources not available for data reception in units of symbols, and
- wherein the rate matching information indicates non-mapping of data to be transmitted in the resources.

* * * * *